(12) United States Patent
Cordill

(10) Patent No.: US 9,602,100 B1
(45) Date of Patent: Mar. 21, 2017

(54) DOWNHOLE MEASUREMENT TOOL HAVING A REGULATED VOLTAGE POWER SUPPLY AND METHOD OF USE THEREOF

(71) Applicant: Automation Solutions, LLC, Bartlesville, OK (US)

(72) Inventor: Leroy David Cordill, Bartlesville, OK (US)

(73) Assignee: Automation Solutions, LLC, Bartlesville, OK (US)

( * ) Notice: Subject to any disclaimer, the term of this patent is extended or adjusted under 35 U.S.C. 154(b) by 487 days.

(21) Appl. No.: 14/160,666

(22) Filed: Jan. 22, 2014

(51) Int. Cl.
*G05F 3/02* (2006.01)
*H03K 17/94* (2006.01)

(52) U.S. Cl.
CPC .................... *H03K 17/94* (2013.01)

(58) Field of Classification Search
CPC ....................................................... H03K 17/94
USPC ......................................................... 307/151
See application file for complete search history.

(56) References Cited

U.S. PATENT DOCUMENTS

| | | | |
|---|---|---|---|
| 3,284,669 A | 11/1966 | Boyd | |
| 3,505,583 A | 4/1970 | Burkhardt et al. | |
| 3,701,004 A | 10/1972 | Tuccinardi et al. | |
| 3,887,863 A | 6/1975 | Brokaw | |
| 3,956,661 A | 5/1976 | Sakamoto et al. | |
| 4,030,023 A | 6/1977 | Keith | |
| 4,352,056 A | 9/1982 | Cave et al. | |
| 4,581,613 A | 4/1986 | Ward et al. | |
| 4,733,160 A | 3/1988 | Draxelmayr | |
| 5,222,867 A | 6/1993 | Walker, Sr. et al. | |
| 5,515,038 A | 5/1996 | Smith | |
| 5,519,313 A * | 5/1996 | Wong | G05F 3/267 323/315 |
| 7,083,392 B2 | 8/2006 | Meza et al. | |
| 7,624,800 B2 | 12/2009 | Jamieson et al. | |
| 7,658,737 B2 | 2/2010 | Hartlaub et al. | |
| 7,795,824 B2 | 9/2010 | Shen et al. | |
| 8,149,552 B1 * | 4/2012 | Cordill | E21B 43/128 361/42 |
| 2013/0177450 A1 | 7/2013 | Magnusson | |
| 2014/0111106 A1 * | 4/2014 | Wei | H05B 41/3925 315/200 R |

FOREIGN PATENT DOCUMENTS

| | | |
|---|---|---|
| CN | 2433761 | 6/2001 |
| JP | 3814635 | 6/2006 |
| RU | 2140523 | 10/1999 |

OTHER PUBLICATIONS www.X-relsemi.com, Visited Dec. 30, 2013.

* cited by examiner

*Primary Examiner* — Hal Kaplan
(74) *Attorney, Agent, or Firm* — Crowe & Dunlevy, P.C.

(57) ABSTRACT

The invention relates generally to downhole measurement tools having a regulated voltage power supply and methods of use thereof. The downhole measurement tools are associated with electrical submersible pumps for providing a stabilization technique for a five (5) volt power supply over a wide temperature range. A voltage regulator circuit for the downhole measurement tools has a temperature dependent resistance to adjust the feedback of the regulated voltage to compensate for the temperature coefficient effects of the other components in the regulator circuit.

19 Claims, 1 Drawing Sheet

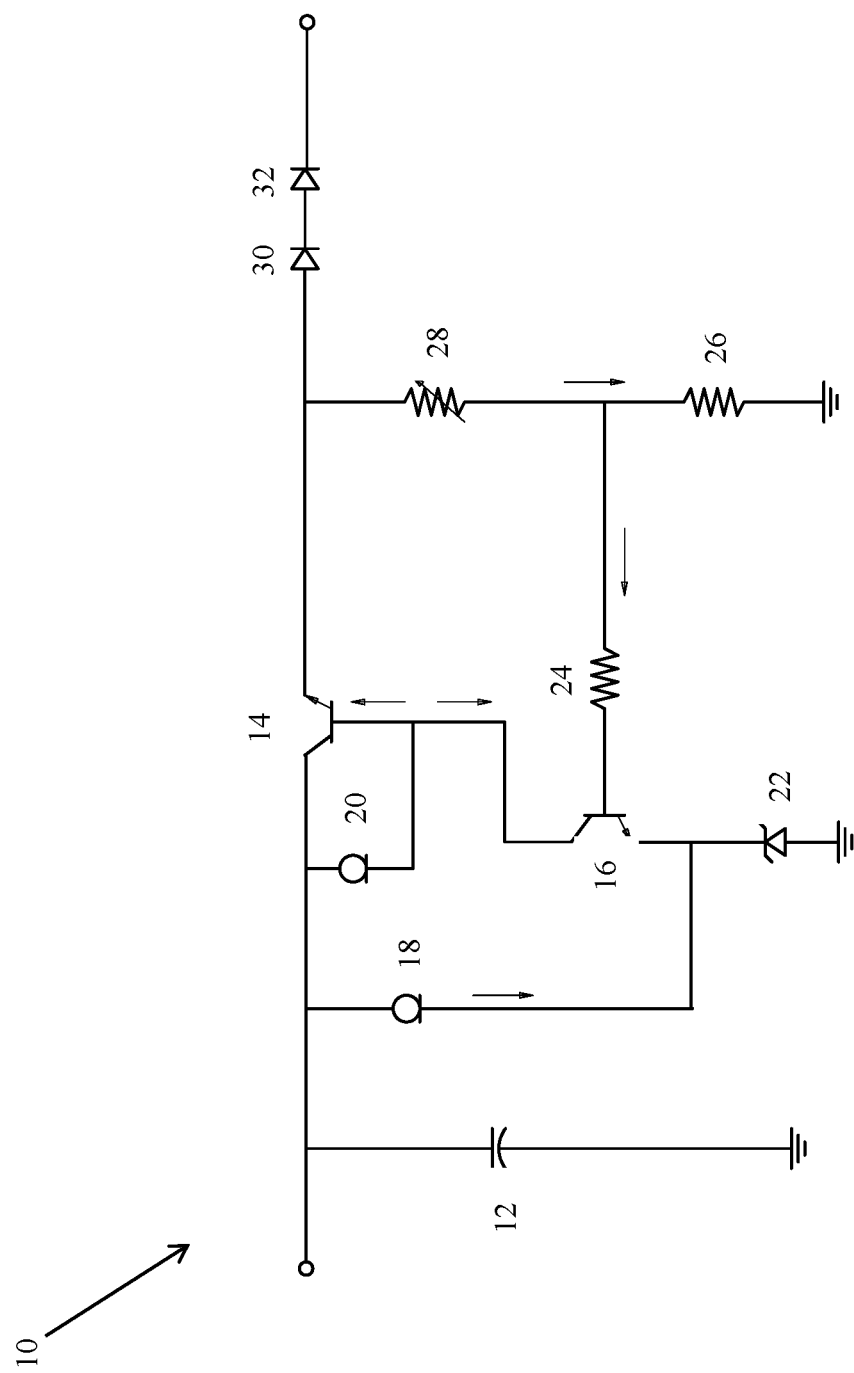

DOWNHOLE MEASUREMENT TOOL HAVING A REGULATED VOLTAGE POWER SUPPLY AND METHOD OF USE THEREOF

CROSS REFERENCE TO RELATED APPLICATIONS

Not Applicable.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

BACKGROUND OF THE INVENTION

1. Field of the Invention

This invention relates to downhole measurement tools having a regulated voltage power supply and method of use thereof, and more particular relates to downhole measurement tools associated with electrical submersible pumps (ESPs) for providing a stabilization technique for a five (5) volt power supply over a wide temperature range.

2. Description of the Related Art

Various types of downhole equipment, such as pumps and similar devices, are used to move fluids from beneath the surface of the earth to the surface. Well known applications include oil and gas wells and water wells. A typical downhole arrangement would include a string composed of a series of tubes or tubing suspended from the surface. One type of well-known pump is a downhole electrical submersible pump. The electrical submersible pump either includes or is connected to a downhole motor which is sealed so that the whole assembly is submerged in the fluid to be pumped. The downhole motor is connected to a three-phase power source at the surface and operates beneath the level of fluid downhole in order to pump the fluid to the surface.

In the common design of many downhole measurement tools associated with an electrical submersible pump, they are connected to the Y-point of the downhole motor of the electrical submersible pump and to the electrical ground of the downhole system. The three-phase power supply for the electrical submersible pump is isolated from the electrical ground, and the downhole measurement tool utilizes this feature to communicate to an associated surface equipment of a downhole system by low frequency modulation of a current or voltage supplied by the associated surface equipment. The downhole measurement tool is coupled to the electrical submersible pump and used to monitor certain downhole parameters, such as pressure and temperature, of a subterranean bore-hole.

With the various protective mechanisms in place, and the several thousand feet of cable involved, the DC voltage supplied to the downhole measurement tool may vary from about nine (9) to about one-hundred (100) volts as information is sent back to the surface equipment from the downhole measurement tool. As the downhole measurement tool is subjected to higher temperature environments, the increased temperature exceeds the operational capabilities of the internal circuitry of most currently available five (5) volt regulator devices. While some specially-graded or designed five (5) volt regulators are available for such high temperature environments, these regulators are extremely expensive compared to low temperature five (5) voltage regulators.

Since the DC current requirements for the circuitry in the downhole measurement tool is relatively low between about eight (8) and twelve (12) milliamps, and can be allowed to vary by about 5%, discrete devices, i.e. transistors, Zener diodes, and resistors, can be used to provide a five (5) volt supply at the required temperature; however, the temperature coefficient of the forward-biased PN junction voltages involved prohibits good voltage regulation over the temperature range from about 25° C. to about 175° C.

It is therefore desirable to provide downhole measurement tools having an improved regulated voltage power supply and method of use thereof.

It is further desirable to provide downhole measurement tools associated with ESPs that provide a stabilization technique for a five (5) volt power supply over a wide range of operating temperatures.

It is still further desirable to provide a five (5) volt regulator circuit for downhole measurement tools, which is low cost and provides better voltage regulation than is achieved with the standard discrete-device voltage regulator circuits.

It is yet further desirable to provide a voltage regulator circuit for downhole measurement tools having a temperature dependent resistance to adjust the feedback of the regulated voltage to compensate for the temperature coefficient effects of the other components in the regulator circuit.

Other advantages and features of the invention will be apparent from the following description and from the claims.

BRIEF SUMMARY OF THE INVENTION

In general, in a first aspect, the invention relates to a regulated voltage power supply circuit capable of stabilizing low frequency modulation of a current or voltage supplied to a downhole measurement tool over a wide range of temperatures. The circuit includes an input/output to receive the supplied voltage and to transmit a regulated voltage. The circuit also includes a voltage feedback path through the circuit, and a temperature dependent device in the feedback path in a manner to regulate the varying voltage to the regulated voltage as an operational temperature of the circuit is increased.

In general, in a second aspect, the invention relates to a downhole system capable of regulating an output voltage between an electrical submersible pump and a downhole measurement tool during increased operational temperatures. The downhole system includes an electrical coupling between a Y-point of a downhole motor of the electrical submersible pump and the downhole measurement tool, and also includes a voltage feedback path having at least one temperature dependent device in the feedback path. The temperature dependent device regulates the voltage based on the increased operational temperature of the system.

The operational temperature of the circuit and/or the system may range between about 25° C. to about 175° C. The temperature dependent device may be a resistance temperature device that stabilizes the regulated voltage by adjusting a feedback signal through the circuit and/or the system. A plurality of resistors may also be in the feedback path, and the nominal resistance of the resistance temperature device in conjunction with the plurality of resistors provides temperature compensation over a range of the operational temperatures. In particular, the resistance temperature device may be a 1000 ohm surface mount temperature-dependent resistance having a nominal 0.00385 (European curve) coefficient.

In general, in a third aspect, the invention relates to a method of regulating a modulating voltage between an electrical submersible pump and a downhole measurement tool during increased operational temperatures. The method includes electrically coupling a Y-point of a downhole motor of the electrical submersible pump to the downhole measurement tool, regulating the modulating voltage using a voltage feedback path during the increased operational temperature, and maintaining a constant signal through the feedback path via a resistance temperature dependent device in the feedback path.

In addition, the step of maintaining the constant signal can also include adjusting a feedback ratio with temperature to cause a voltage at an emitter of a first transistor to increase to compensate for voltage changes at a base of a second transistor and across a pair of diodes due to a change in the operational temperatures. Moreover, the method can also include selecting a nominal resistance of the resistance temperature device in conjunction with a plurality of resistors of the feedback path, and providing temperature compensation based on the increased operational temperature.

BRIEF DESCRIPTION OF THE DRAWINGS

FIG. 1 is an electrical schematic of an example of the circuitry of the downhole measurement tool in accordance with an illustrative embodiment of the downhole measurement tools having an improved regulated voltage power supply and method of use thereof disclosed herein.

DETAILED DESCRIPTION OF THE INVENTION

The circuits and methods discussed herein are merely illustrative of specific manners in which to make and use the invention and are not to be interpreted as limiting in scope. In particular, the invention is exemplified for use in a downhole measurement tool, but is not so limited as it can be used for any electrical apparatus that requires a low current five (5) volt regulated supply at temperatures up to about 175° C.

Further, while the circuits and methods have been described with a certain degree of particularity, it is to be noted that many modifications may be made in the construction and the arrangement of the structural and function details disclosed herein without departing from the scope of the invention. It is understood that the invention is not limited to the embodiments set forth herein for purposes of exemplification.

A regulated voltage power supply circuit and method 10 is provided herein to stabilize over a wide range of temperatures low frequency modulation of a current or voltage supplied to a downhole measurement tool by the associated surface equipment. The circuit and method 10 apply to the downhole measurement tool (not shown) electrically coupled to the Y-point of an electrical submersible pump (not shown). As is common with three-phase powered electrical submersible pumps, a downhole motor that has three field coils with each of the field coils having a common connection at one end, the Y-point, and their other ends are respectively coupled through leads to a source of three-phase power (not shown). The source of three-phase power produces alternating voltage on the three field power leads, which are out of phase with respect to one another by one hundred and twenty degrees. The Y-point of the downhole motor of the electrical submersible pump is electrically coupled to an input capacitor 12 at one end of the circuit 10 for regulating voltage over a wide temperature range, and the other end of the circuit 10 is connected to additional circuitry, as appropriate, of the downhole measurement tool.

While the downhole measurement tool is operating, an unregulated DC voltage is input to the regulator circuit 10, and typically varies from about nine (9) to about thirty-two (32) volts. As schematically illustrated in FIG. 1, transistor 14 functions as a series pass element, with transistor 14 base connected to the collector of transistor 16, where transistor 16 serves to control the current into the base of transistor 14 to regulate the output from the emitter of transistor 14. Transistor 16 functions as the primary gain element in the feedback path to control the signal to the base of transistor 14.

Diode 18 and diode 20 are current regulating diodes. Diode 18 provides a stable current to diode 22, which is a Zener diode, and functions as the primary voltage reference in the circuit. Current regulating diode 20 provides a stable current to the base of transistor 14 and collector of transistor 16. The feedback effect of transistor 16 controls the amount of current that flows into the base of transistor 14, which provides the overall voltage regulating function.

Resistors 24, 26, and 28 form the feedback path from the emitter output of transistor 14 through transistor 16 to control the voltage at the emitter of transistor 14. Diodes 30 and 32 are used as series elements. The variation of forward voltage drop across diodes 30 and 32 due to temperature change is used to compensate for other voltage variations with temperature in the circuit 10, and allow the voltage at the emitter of transistor 14 to be sufficiently high to provide a suitable feedback current to the base of transistor 16 through the resistor 24, 26, and 28 feedback path. Resistor 28 is a temperature-dependent resistance, and provides the additional temperature dependent compensation for the circuit 10.

In the exemplary embodiment, the circuit and method 10 include the temperature-dependent resistance for 28, as shown in FIG. 1, to adjust the feedback ratio with temperature to cause the voltage at the emitter of transistor 14 to increase enough to compensate for the difference in voltage change at the base of transistor 16 and that cross diodes 30 and 32. The temperature-dependent resistance resistor 28 allows the output voltage from the circuit 10 to be more stable over the required temperature range.

As illustrated in FIG. 1, diodes 18 and 20 may be 1N5297 current regulating diodes, which are nominal 1 milliamp current flow devices that minimize the overall quiescent current of the regulator circuit 10 while still supplying sufficient current through diode 22. Diode 22 may be a 1N5231C, which is a nominal 5.1 volt 2% tolerance Zener diode that is operated at a low enough current in order to exhibit an actual breakdown of about 4.7 volts at 25° C. Diode 22 and operating point of the circuit and method 10 may be chosen to be near the point of minimum temperature coefficient for Zener diodes.

Transistor 14 can be a 2N3440, which is a silicon NPN transistor with a gain of between 40 and 150, and packaged in a metal can suitable for the temperature range of about 25°

C. to about 175° C. Transistor 16 can be a 2N2222, which is a silicon NPN transistor with a gain of at least 50, and packaged in a metal can suitable for the operational temperature range. Diodes 30 and 32 may be 1N5627, which are silicon diodes suitable for the operational temperature range. Resistor 28 is a 1000 ohm surface mount temperature-dependent resistance, with a nominal 0.00385 (European curve) coefficient. Capacitor 12 can be a nominal 0.68 microfarad ceramic capacitor suitable for the input voltage and operational temperature range. While the circuit and method 10 of the invention are illustrated and exemplified using the particular components discussed above, a person having ordinary skill in the art will appreciate that other components with similar characteristics may be utilized.

Whereas, the circuits and methods have been described in relation to the drawings and claims, it should be understood that other and further modifications, apart from those shown or suggested herein, may be made within the scope of the invention.

What is claimed is:

1. A regulated voltage power supply circuit capable of stabilizing low frequency modulation of voltage supplied to a downhole measurement tool over a wide range of temperatures, said circuit comprising:
   an input and output to receive said supplied voltage and to transmit a 5 volt regulated voltage;
   a voltage feedback path through said circuit; and
   a temperature dependent device in said feedback path in a manner to regulate said supplied voltage to said regulated voltage as an operational temperature of said circuit is increased.

2. The circuit of claim 1 wherein said operational temperature ranges between about 25° C. to about 175° C.

3. The circuit of claim 1 wherein said temperature dependent device is a resistance temperature dependent device.

4. The circuit of claim 3 where said resistance temperature dependent device stabilizes said regulated voltage by adjusting a feedback signal through said circuit.

5. The circuit of claim 3 wherein said circuit further comprises a plurality of resistors in said feedback path.

6. The circuit of claim 5 wherein nominal resistance of said resistance temperature dependent device in conjunction with said plurality of resistors of said feedback path provides temperature compensation over a range of said operational temperatures.

7. The circuit of claim 5 wherein said resistance temperature dependent device is a 1000 ohm surface mount resistance temperature dependent device having a nominal 0.00385 (European curve) coefficient.

8. A downhole system capable of regulating an output voltage between an electrical submersible pump and a downhole measurement tool during an increased operational temperature, said downhole system comprising:
   an electrical coupling between a Y-point of a downhole motor of said electrical submersible pump and said downhole measurement tool; and
   a voltage feedback path having at least one resistance temperature dependent device in said feedback path, wherein said resistance temperature dependent device regulates said output voltage based on said increased operational temperature of said system.

9. The system of claim 8 wherein said operational temperature ranges between about 25° C. to about 175° C.

10. The system of claim 8 where said resistance temperature dependent device stabilizes said output voltage by adjusting a feedback signal through said feedback path.

11. The system of claim 10 wherein nominal resistance of said resistance temperature dependent device in conjunction with a plurality of resistors of said feedback path provides temperature compensation based on said increased operational temperature of said circuit.

12. The system of claim 8 wherein said resistance temperature dependent device is a 1000 ohm surface mount temperature-dependent resistance temperature dependent device having a nominal 0.00385 (European curve) coefficient.

13. The system of claim 8 wherein said regulated output voltage is a 5 volt regulated output voltage.

14. A method of regulating an output voltage between an electrical submersible pump and a downhole measurement tool during an increased operational temperature, said method comprising the steps of:
   electrically coupling a Y-point of a downhole motor of said electrical submersible pump to said downhole measurement tool;
   regulating said voltage using a voltage feedback path during said increased operational temperature; and
   maintaining a stabilized signal through said feedback path via a resistance temperature dependent device in said feedback path.

15. The method of claim 14 wherein said operational temperatures range between about 25° C. and about 175° C.

16. The method of claim 14 wherein said step of maintaining said stabilized signal further comprises the step of adjusting a feedback ratio with temperature to cause a voltage at an emitter of a first transistor to increase to compensate for voltage changes at a base of a second transistor and across a pair of diodes due to a change in said operational temperatures.

17. The method of claim 14 further comprising the steps of:
   selecting a nominal resistance of said resistance temperature dependent device in conjunction with a plurality of resistors of said feedback path, and
   providing temperature compensation based on said increased operational temperature.

18. The method of claim 17 wherein said resistance temperature dependent device is a 1000 ohm surface mount resistance temperature dependent device having a nominal 0.00385 (European curve) coefficient.

19. The method of claim 14 wherein said regulated output voltage is a 5 volt regulated output voltage.

* * * * *

UNITED STATES PATENT AND TRADEMARK OFFICE
CERTIFICATE OF CORRECTION

| | | |
|---|---|---|
| PATENT NO. | : 9,602,100 B1 | Page 1 of 1 |
| APPLICATION NO. | : 14/160666 | |
| DATED | : March 21, 2017 | |
| INVENTOR(S) | : Cordill | |

It is certified that error appears in the above-identified patent and that said Letters Patent is hereby corrected as shown below:

On the Title Page

Item [73], delete "Automation Solutions, LLC" and insert --Automation Solutions, Inc.--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*